US009389321B2

(12) United States Patent
Yasui

(10) Patent No.: US 9,389,321 B2
(45) Date of Patent: Jul. 12, 2016

(54) CRYSTALLINE SCINTILLATOR BODY AND RADIATION DETECTOR

(71) Applicant: CANON KABUSHIKI KAISHA, Tokyo (JP)

(72) Inventor: Nobuhiro Yasui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 14/460,084

(22) Filed: Aug. 14, 2014

(65) Prior Publication Data
US 2015/0346359 A1 Dec. 3, 2015

(30) Foreign Application Priority Data
Aug. 20, 2013 (JP) .................. 2013-170447

(51) Int. Cl.
G01T 1/20 (2006.01)
G01T 1/202 (2006.01)

(52) U.S. Cl.
CPC ............. G01T 1/2023 (2013.01); G01T 1/2006 (2013.01)

(58) Field of Classification Search
CPC ..... G01T 1/202; G01T 1/2023; G01T 1/2018; G01T 1/2006

USPC ........................................ 250/370.11
See application file for complete search history.

(56) References Cited

U.S. PATENT DOCUMENTS

| | | | | |
|---|---|---|---|---|
| 3,605,039 A | * | 9/1971 | Harris et al. | 372/23 |
| 4,348,611 A | * | 9/1982 | Ruppel et al. | 313/388 |
| 2002/0175289 A1 | * | 11/2002 | Soluri et al. | 250/363.1 |
| 2011/0248366 A1 | * | 10/2011 | Saito et al. | 257/429 |
| 2012/0049073 A1 | * | 3/2012 | Den et al. | 250/361 R |
| 2012/0292516 A1 | | 11/2012 | Yasui | |

FOREIGN PATENT DOCUMENTS

JP 2012-131964 A 7/2012
JP 2012207162 A * 10/2012

OTHER PUBLICATIONS

Machine Translation for JP 2012-207162 A, Ohashi et al.*

* cited by examiner

Primary Examiner — Mark R Gaworecki
(74) Attorney, Agent, or Firm — Canon U.S.A., Inc., IP Division

(57) ABSTRACT

A crystalline scintillator body includes a plurality of first crystalline phases and a second crystalline phase in which the plurality of first crystalline phases are present. Each first crystalline phase is a columnar crystal made of a material containing at least one of CsI and RbI, and the second crystalline phase is made of a material containing NaNO$_3$.

15 Claims, 3 Drawing Sheets

50 μm

50 μm

CRYSTALLINE SCINTILLATOR BODY AND RADIATION DETECTOR

BACKGROUND OF THE INVENTION

1. Field of the Invention

The present application relates to a crystalline scintillator body that emits light upon irradiation with radiation and to a radiation detector including the crystalline scintillator body.

2. Description of the Related Art

In an X-ray computed tomography (CT) apparatus used for medical practice, a scintillator emits light upon receiving x-rays through a body, and a photodetector detects the light from the scintillator. Japanese Patent Laid-Open No. 2012-131964 (also published as U.S. Patent Application Publication 2012/0292516) discloses a crystalline scintillator body (phase-separated crystalline scintillator body) including a plurality of columnar crystals (cylindrical phases) and another crystalline phase (matrix phase) in which the columnar crystals are present. In this crystalline scintillator body, the material forming the cylindrical phases has a different refractive index from the material forming the matrix phase. Consequently, this crystalline scintillator has a wave-guiding function. Scintillators having wave-guiding function can reduce crosstalk more than scintillators not having a wave-guiding function.

In the type of the above-cited patent document, a phase-separated scintillator including cylindrical phases made of a scintillator material having a higher refractive index than the material of the matrix phase can reduce crosstalk particularly effectively. The above-cited patent document discloses a NaI—RbI crystalline body as such a phase-separated scintillator. In this crystalline body, the NaI forming the cylindrical phases functions as a scintillator. Unfortunately, NaI is deliquescent.

SUMMARY OF THE INVENTION

According to an aspect of the application, a crystalline scintillator body is provided which includes a plurality of first crystalline phases, and a second crystalline phase in which the plurality of first crystalline phases are present. According to one aspect, each first crystalline phase is a columnar crystal made of a material containing at least one of CsI and RbI, and the second crystalline phase is made of a material containing $NaNO_3$.

Other aspects of the application will become apparent from the following description.

Further features of the present invention will become apparent from the following description of exemplary embodiments with reference to the attached drawings.

DESCRIPTION OF THE EMBODIMENTS

It is known that NaI is deliquescent. The present embodiment will illustrate a phase-separated crystalline scintillator body whose cylindrical phases are made of a scintillator material having a higher refractive index than the material of the matrix phase, and which is less deliquescent than NaI—RbI.

The crystalline scintillator body of the present embodiment has a phase separation structure including a plurality of first crystalline phases and a second crystalline phase in which the plurality of first crystalline phases are present. Each of the first crystalline phases is a columnar crystal containing at least one of CsI and RbI and may be referred to as a cylindrical phase. The second crystalline phase contains $NaNO_3$ and may be referred to as a matrix phase. Since CsI and RbI emit light upon excitation by irradiation with radiation, the first crystalline phases function as scintillator phases. The phrase "to emit light upon irradiation with radiation" and similar expressions used herein may refer to what is called scintillation (to produce luminescence upon irradiation with radiation) or emission of photostimulated fluorescence (to produce fluorescence when the trap sites of carriers generated by irradiation with radiation are excited by irradiation with light). Also, a body capable of emitting photostimulated fluorescence is also called scintillator.

Since $NaNO_3$ has a lower refractive index than CsI and RbI, part of the light from the first crystalline phases is totally reflected at the interfaces between the first crystalline phases and the second crystalline phase and is thus guided in the first crystalline phases. The phase-separated scintillator refers to a scintillator having a phase-separated structure.

The present embodiment will be further described with reference to the drawings.

Structure of Phase-Separated Crystalline Scintillator Body

Figure 1:
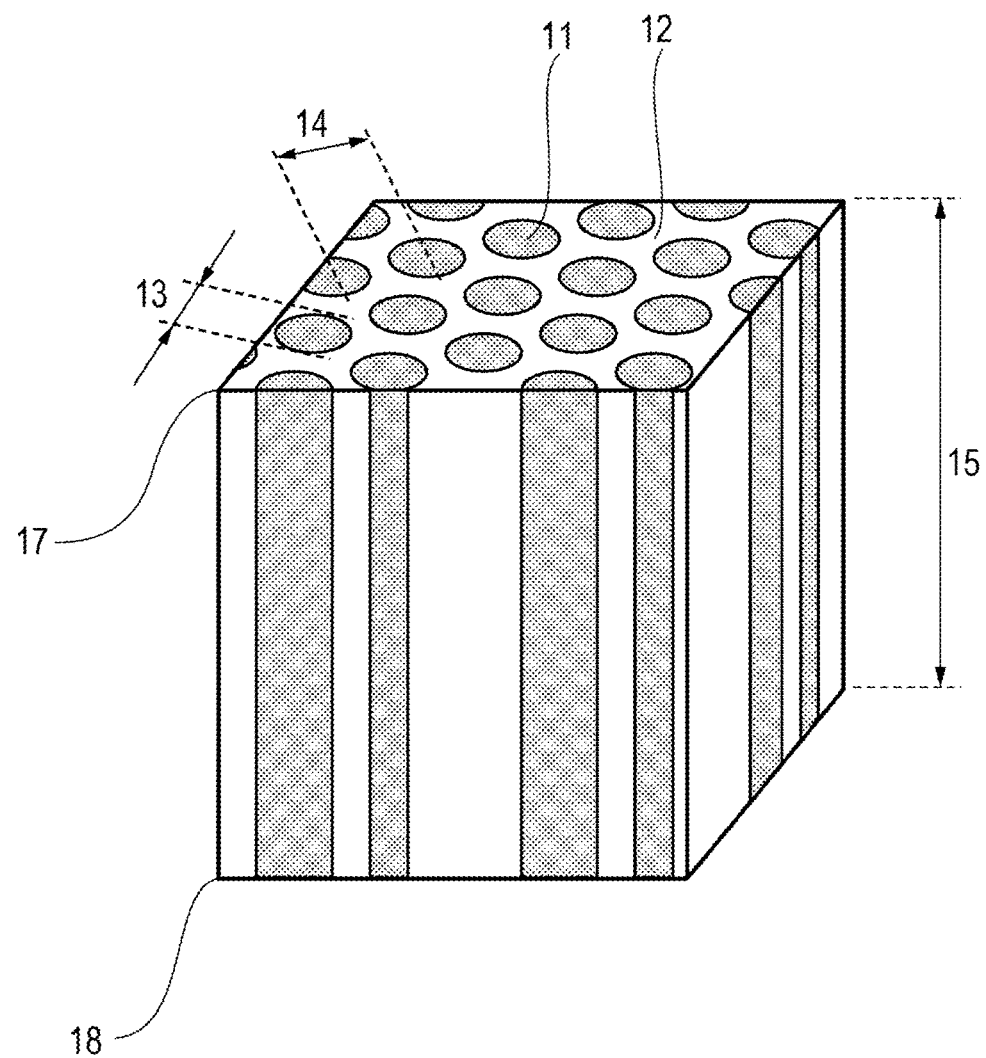
FIG. 1 is a schematic perspective view of a phase-separated crystalline scintillator body according to an embodiment.

FIG. 1 shows a schematic structure of a phase-separated crystalline scintillator body according to the present embodiment.

The crystalline scintillator body of the present embodiment includes a plurality of first columnar crystalline phases 11 extending in one direction and a second crystalline phase 12 in which the first crystalline phases are present with the side walls thereof covered with the second crystalline phase. The first crystalline phase 11 is not limited to being in a cylindrical shape and may be in a prismatic shape having a plurality of crystal planes. Also, the prismatic shape is not limited to being regularly prismatic. The plurality of first crystalline phases may have a structure in which some of the columns (prisms) of the first crystalline phases are continuously connected.

The first crystalline phases 11 are made of a material having a higher refractive index than the material of the second crystalline phase 12. Therefore part of the light from the first crystalline phases is totally reflected at the interfaces between the first crystalline phases and the second crystalline phase, thus running through the first crystalline phases while guided therein. Accordingly, it is advantageous that at least some of the first crystalline phases lie in a continuous manner from a first face (upper face) 17 of the scintillator body to a second face (lower face) 18 thereof. Some of the first crystalline phases, however, may be discontinuous, branched, fused with other columns, varied in diameter, or bent. In the embodiment shown in FIG. 1, the first face 17 and the second face 18 are parallel to each other. However, the first crystalline phases 11 may be bent on purpose by appropriately controlling the direction of the solidification interface. Hence, the first face 17 and the second face 18 are not coplanar. It should be appreciated that FIG. 1 is a schematic exemplary representation.

The first crystalline phases preferably have a diameter 13 in the range of 50 nm to 30 μm at the first face. The first crystalline phases are preferably arranged with a period 14 in the range of 500 nm to 50 μm. The period of the first crystalline phases used herein refers to the average of the distances between the centers of two closest crystalline phases at the first face. If the period of the first crystalline phases has variations, when the average of the distances between each first crystalline phase is in the range of 500 nm to 50 μm, the period 14 of the first crystalline phases is considered to be in the range of 500 nm to 50 μm. The period need not be strictly measured, and it may be estimated by, for example, counting the number of first crystalline phases within a width of 1 mm and then dividing 1 mm by that number. If the first crystalline phases are not cylindrical, the smallest diameter of each first crystalline phase is preferably in the range of 50 nm to 30 μm. In addition, for each first crystalline phase, the ratio of the largest diameter to the smallest diameter is preferably an average of 10 or less. If it is 10 or more, the first crystalline phases should not be columnar, but lamellar. However, even if some of the columnar crystals have a largest/smallest diameter ratio of 10 or more, such crystalline phases are acceptable as long as the average of largest/smallest diameter ratios is 10 or less. The smallest diameter of a first crystalline phase refers to the smallest length of the line segments each passing through the center of gravity of the columnar crystal at a section of the crystalline scintillator body (section taken in the direction perpendicular to the direction in which light is guided) and linking two points on the periphery of the columnar crystal. Similarly, the largest diameter of a first crystalline phase refers to the largest length of the line segments each passing through the center of gravity of the columnar crystal at a section and linking two points on the periphery of the columnar crystal. If the crystalline scintillator body of the present embodiment is used in a radiation detector in combination with a detector or a detector array, it is advantageous that the crystalline scintillator body has a structure in which two or more first crystalline phases are arranged on the light-receiving region of each pixel of the detector. In other words, it is advantageous that the period of the first crystalline phases is half or less of the width of the light-receiving region of the pixel of the detector. For example, when the light-receiving region is a square 20 μm on a side, the crystalline scintillator body may have a structure in which the columnar crystals have a diameter of 5 μm and are arranged with a period of 8 μm. Accordingly, it is advantageous to combine some columnar crystals having different sizes so as to be adapted to the size of the light-receiving region without being limited to the above ranges.

The thickness 15 of the crystalline scintillator body can be adjusted as required depending on the production process.

The first crystalline phases, which contain at least either CsI (cesium iodide) or RbI (rubidium iodide), emit light upon excitation by irradiation with radiation. Thus the first crystalline phases will function as scintillator phases. A mixed crystal of CsI and RbI in a desired proportion may be used as the first crystalline phases. Such a mixed crystal may have a composition expressed by $Cs_xRb_{1-x}I$ (0≤X≤1). In this instance, X is preferably in the range 0.00≤X<0.15 or 0.85<X≤1.00. When X is in these ranges, the mixed crystal is most stable and is unlikely to cloud afterward. Meanwhile, when X=0 or X=1 holds true, CsI and RbI do not form their mixed crystal and the first crystalline phases contain crystals of either CsI (X=0) or RbI (X=1). The first crystalline phases may further contain any other element in addition to $Cs_xRb_{1-x}I$. More specifically, the Cs or Rb site may be partially substituted with at least one of K (potassium), Na (sodium) and Li (lithium). Also, both the Cs and Rb sites may be partially substituted with at least one of K (potassium), Na (sodium) and Li (lithium). The proportion of the substituent is preferably less than 1% by mole to the total amount of the Cs and Rb. The I (iodine) site may also be partially substituted with at least one of Br (bromine), Cl (chlorine) and F (fluorine). The proportion of such a substituent is preferably less than 1% by mole to the amount of the I.

The first crystalline phases may further contain a trace amount of another element as a luminescent center. The luminescent center may be appropriately selected according to the desired properties in luminance, emission wavelength, luminescence decay time and the like, and may be a single element or a plurality of elements. For example, it may be selected from the elements of alkali halides whose electrons take (ns)2 configuration, such as Cu, Ag, Au, Ga, In, Tl, Sn, Pb, Sb, and Bi, or from the rare-earth elements, such as Ce, Pr, Nd, Sm, Eu, Gd, Tb, Dy, Ho, Er, Tm, Yb, and Lu. Na may also be selected. From the viewpoint of increasing luminance, it is advantageous that the first crystalline phases contain at least one of Tl, In and Ga as the luminescent center of the crystalline scintillator body. Such a luminescent center may be added not only to the first crystalline phases, but also to the second crystalline phase. The first crystalline phases do not necessarily all have the same composition. For example, some of the first crystalline phases may have the composition $Cs_{0.05}Rb_{0.95}I$ while the others may have the composition $RCs_{0.14}Rb_{0.86}I$. However, the compositions of the first crystalline phases are all desirably the same. If the difference among the compositions is large, the refractive index ratio to the second crystalline phase is liable to vary widely.

The second crystalline phase contains $NaNO_3$ (sodium nitrate). The second crystalline phase may further contain a salt of nitrogen oxides other than $NaNO_3$. For example, it may contain $NaNO_2$. The proportion of $NaNO_2$ is however preferably less than 1 mol % to the amount of $NaNO_3$. The second crystalline phase may contain a nitrogen oxide salt other than sodium salts, such as $CsNO_3$, $RbNO_3$, $KNO_3$ and $LiNO_3$. The proportion of the nitrogen oxide salt other than sodium salts is however preferably less than 1% by mole to the amount of $NaNO_3$.

The second crystalline phase 12 may also emit light upon irradiation with radiation.

In the phase-separated crystalline scintillator body of the present embodiment, a phase-separated structure is formed by a eutectic solidification of the material of the first crystalline phases and the material of the second crystalline phase. A phase-separated structure formed by a eutectic solidification is herein referred to as eutectic phase-separated structure. For forming a eutectic phase-separated structure in a crystalline scintillator body, the composition ratio in the scintillator body of the material of the first crystalline phases to the material of the second crystalline phase is desirably the eutectic composition ratio shown in Table 1.

TABLE 1

| 1st crystalline phases:2nd crystalline phase | Eutectic composition ratio (mole basis) | Eutectic temperature (° C.) |
|---|---|---|
| CsI:NaNO$_3$ | 20:80 | 243 |
| RbI:NaNO$_3$ | 20:80 | 246 |

As shown in Table 1, when the material of the first crystalline phases is either CsI or RbI, the eutectic composition ratio of the first crystalline phases to $NaNO_3$ forming the second crystalline phase is 20:80 on a mole basis. Accordingly, even if the first crystalline phases are made of mixed crystals of CsI and RbI, the mixed material and NaNO$_3$ can form a eutectic structure with a eutectic composition ratio in the same range.

In order to form a scintillator crystal body having a phase-separated structure as shown in the schematic representation of FIG. 1, it is desirable that the scintillator crystal body be generally formed of a composition shown in Table 1. The compositions shown in Table 1 meet the eutectic temperature. When the ratio of the first and second crystalline phase materials is generally within ±5% by mole of the eutectic composition ratio, the first and second crystalline phases have a eutectic relationship when the materials form a structure, depending on the crystallization speed (solidification speed). Hence, even if the composition ratio in a scintillator body deviates by about ±5% by mole from the eutectic composition ratio, the scintillator body can have a eutectic phase-separated structure as shown in FIG. 1. If the composition ratio of a melt deviates so widely from the eutectic composition ratio that a eutectic system cannot be formed, either phase precipitates first. This can be a main reason of disturbing the structure. In such a case, however, either phase precipitates first from the melt to some extent, so that the composition ratio of the melt comes close to the eutectic composition ratio. Consequently, the formation of a eutectic system is started in the middle of the solidification. In this instance, by removing the structure formed by precipitation of only either of the phases, a scintillator crystal having a eutectic phase-separated structure can be formed.

One of the features of the phase-separated scintillator of the present embodiment is to guide light. This feature is produced by total reflection of part of light from the first crystalline phases at the boundaries between the first crystalline phases and the second crystalline phase, resulting from the difference in refractive index between the material of the first crystalline phases 11 and the material of the second crystalline phase 12. In the description, the refractive index of the material of the first crystalline phases 11 may be simply referred to as the refractive index of the first crystalline phases, and the refractive index of the material of the second crystalline phase 12 may also be referred to as the refractive index of the second crystalline phase. Table 2 shows refractive indices of first and second crystalline phases in exemplary phase-separated scintillators according to the present embodiment.

TABLE 2

| Material (1st crystalline phase-2nd crystalline phase) | Refractive index of first crystalline phase | Refractive index of second crystalline phase |
|---|---|---|
| CsI—NaNO$_3$ | 1.80 | 1.59 |
| RbI—NaNO$_3$ | 1.61 | 1.59 |

The refractive index varies easily due to dependence on wavelength or the presence of additives, thus not necessarily strictly correct. The measurement of refractive index is intended to confirm the first crystalline phases have a higher refractive index than the second crystalline phase.

According to Snell's law, when light is about to enter at an angle (critical angle) to a medium having a lower refractive index from a medium having a higher refractive index, total reflection occurs. If the incident angle is smaller than the critical angle, reflection and refraction should occur. Therefore, the phase-separated scintillator of the present embodiment, which has difference refractive indices therein as shown in Table 2, allows a state in which light is prevented from diverging by total reflection in the medium having the higher refractive index. Thus, light will propagate while being more easily confined in the medium having the higher refractive index by repeated refraction and reflection. Therefore, a phase-separated scintillator in which the ratio of the refractive index of the matrix phase to the refractive index of the columnar phases is smaller than 1 can guide light more satisfactorily than a phase-separated scintillator having a refractive index ratio of 1. The refractive index ratio is desirably less than 1, and it is preferably 0.99 or less, more preferably 0.95 or less, and still more preferably 0.90 or less. In the phase-separated scintillator body of the present embodiment, the first crystalline phases have a higher refractive index than the second crystalline phase. Accordingly, light emitted in the columnar first crystalline phases is guided, at least in part, through the first crystalline phases. As shown in Table 2, CsI has a higher refractive index than RbI. Accordingly, CsI—NaNO$_3$ has a smaller second phase/first phase refractive index ratio than RbI—NaNO$_3$. It is therefore advantageous that the first crystalline phases are made of a material expressed by Cs$_x$Rb$_{1-x}$I (0.85<X≤1.00). In addition, since the columnar first crystalline phases contain CsI or RbI capable of functioning as a scintillator, the phase-separated scintillator of the present embodiment exhibit higher wave-guiding ability than phase-separated scintillators having a structure in which columnar crystals are surrounded by a scintillator phase. The scintillator body of the present embodiment allows efficient total reflection in the columnar crystals.

NaI is deliquescent. Accordingly, NaI is difficult to handle and must be prevented from absorbing moisture for use. On the other hand, CsI and RbI are considered to be less deliquescent than NaI. Accordingly, a combination of CsI or RbI and a nitrate is expected to function as a less deliquescent phase-separated scintillator than the phase-separated scintillator (NaI—RbI) disclosed in the above-cited patent document, and is thus promising.

Production of Phase-Separated Crystalline Scintillator Body

The crystalline scintillator body of the present embodiment is produced through the formation of a eutectic phase-separated structure using the material of the first crystalline phases and the material of the second crystalline phase. For enabling the first crystalline phases and the second crystalline phase to be formed in a eutectic phase-separated structure, a material system capable of entering into a eutectic composition is fused and then solidified along a direction. In particular, it is desirable to control temperature gradient so as to flatten the solid-liquid interfaces, and preferably to about 30° C./mm or more. On the other hand, the temperature gradient may be reduced to prevent cracks caused by thermal stress on the crystals, within a range in which the structure of the present embodiment can be formed without problems. It is also advantageous that the crystallized portion of the material system is reheated to prevent the occurrence of cracks to the extent that it is not melted. Also, a structure formed in what is called Eutectic Coupled Zone having correlations inherent in the material system among the composition ratio of the material system capable of forming a eutectic phase-separated structure, the temperature gradient and the solidification speed is herein referred to as eutectic phase-separated structure. Hence, a phase-separated structure formed by simultaneous solidification of the constituents can be considered to be a eutectic phase-separated structure even if the composition ratio in the structure deviates from the eutectic composition ratio. The term eutectic mentioned herein refers to simultaneously solidifying the material of the first crystalline phases and the material of the second crystalline phase.

The phase-separated scintillator body of the present embodiment can be produced in a manner as shown in FIG.

Figure 2A:
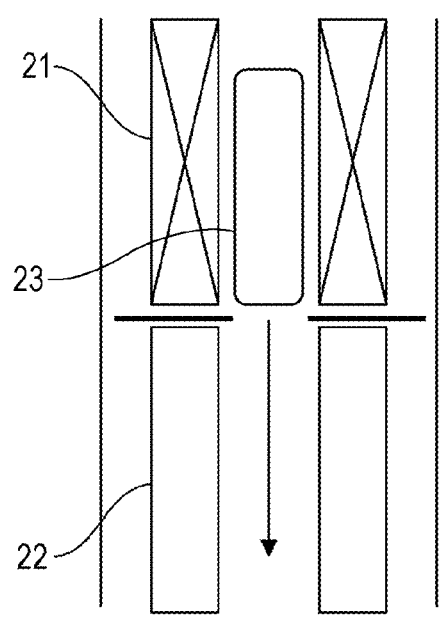
FIG. 2A is a schematic sectional view of an apparatus for producing the phase-separated crystalline scintillator body of the embodiment.
Figure 2B:
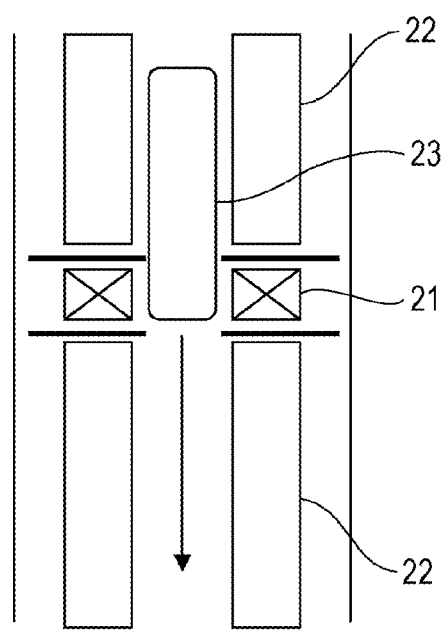
FIG. 2B is a schematic sectional view of an apparatus for producing the phase-separated crystalline scintillator body of the embodiment.

2A or 2B by the Bridgman method, which can control the position of the solidification interface of a sample by moving a heater or the sample at a constant speed in a state where the sample is enclosed in a quartz cylindrical tube to be protected from oxidation and set in a vertical position. An apparatus for the Bridgman method includes a heater 21 having a length comparable to the length of the sample 23, and a water-cooling portion 22 adapted to control the temperature gradient in the apparatus to 30° C./mm, as shown in FIG. 2A. The water-cooling portions 22 may be disposed at the upper and the lower side of the apparatus and the heater 21 may cover only a part of the sample 23, as shown in FIG. 2B. Alternatively, the scintillator body of the present embodiment may be produced by another method similar to this method.

The scintillator body may be produced by the Czochralski method or the like in which the crystal is pulled up from a melt. Unlike the Bridgman method, this method performs solidification with the sample not enclosed in a sample tube or container, thus advantageously forming a solid-liquid interface without being affected by the wall of the sample tube or container. A floating zone method may also be applied.

In the Bridgman method, the solidification speed must be set so that the solid-liquid interface of the sample can be formed as flat as possible. In this method, unfortunately, solidification speed depends on the diameter of the sample because the sample is subjected to thermal exchange mainly from the side thereof. More specifically, since thermal exchange for a sample having a large diameter takes a long time, the solidification speed of the sample should be set low, otherwise the solid-liquid interface is considerably curved and results in warped columnar crystals or first crystalline phases 11 in most region of the sample. This is because columnar crystals grow in a direction substantially perpendicular to the solid-liquid interface. If the solidification speed is higher relative to the sample size, the solid-liquid interface not only cannot be formed flat, but also cannot be kept smooth, and the uneven interface with micro-asperities causes dendritic crystals to grow. This should be avoided. It is therefore desirable to set a sufficient temperature gradient for forming solid-liquid interfaces and to solidify the sample at a solidification speed (bringing down speed in the apparatus) of 850 mm/h or less. Preferably, the solidification speed is 500 mm/h or less and more preferably 300 mm/h or less.

It is considered that the diameter and period of the first crystalline phases 11 of a phase-separated crystalline scintillator body depend on solidification speed, and particularly that the period of columnar crystals and solidification speed have a relationship expressed by the following equation: $\lambda^2 \cdot v = $ constant, where $\lambda$ represents period and $v$ represents solidification speed. This equation suggests that in order to form a periodical structure with a desired period, solidification speed is roughly limited. On the other hand, the solidification speed for forming a flat, smooth solid-liquid interface is controlled in the production process, and accordingly, the period $\lambda$ is limited in the range of 500 nm to 50 μm. Accordingly, the smallest diameter of the columnar crystals becomes in the range of 50 nm to 30 μm. The composition of the mixture of the raw materials prepared for the crystalline scintillator body will now be described. Although the above-described composition ratio in the phase-separated scintillator body is within ±5% by mole of the eutectic composition ratio shown in Table 1, the composition in the material prepared may be outside the range of ±5% by mole. This is because in the Bridgman method, a melt of all the materials is simultaneously solidified in one direction, so that the portion of the melt having a composition varying from the eutectic composition is first precipitated in the beginning of solidification, and the rest of the melt has a eutectic composition. In the case of Czochralski method, the portion of the melt whose composition varies from the eutectic composition is first pulled up. The portion having a composition varying from the eutectic composition may be previously solidified by pre-pulling so that the rest of the melt has a eutectic composition, followed by pulling up from the melt again. Unwanted portions can be cut off after the scintillator body has been formed.

Use of Phase-Separated Scintillator Body

The phase-separated crystalline scintillator body of the present embodiment may be combined with a photodetector to be used as a radiation detector for medical practice, industrial application, high-energy physics, space technology, or the like. In particular, such a detector has the function of guiding light without using division walls and is accordingly useful in a condition in which light must be guided to the detector in a specific direction. Also, the scintillator body is useful to be used in an X-ray CT apparatus requiring a division wall, or to be used as an alternative to the CsI needle crystals of an X-ray flat panel detector (FPD). In these cases, the emission wavelength of the scintillator body may be adjusted to adapt for the photoreceptive sensitivity of the detector. For adjusting the emission wavelength, other types of elements or a luminescence center may be added to the first crystalline phases.

The phase-separated crystalline scintillator body and a photodetector may be arranged in such a manner that they are in direct contact with each other. Alternatively, the photodetector and the crystalline scintillator body may be arranged with a film or layer therebetween for protecting the photodetector or preventing reflection.

EXAMPLE 1

In Example 1, phase-separated scintillators were produced.

Figure 3A:
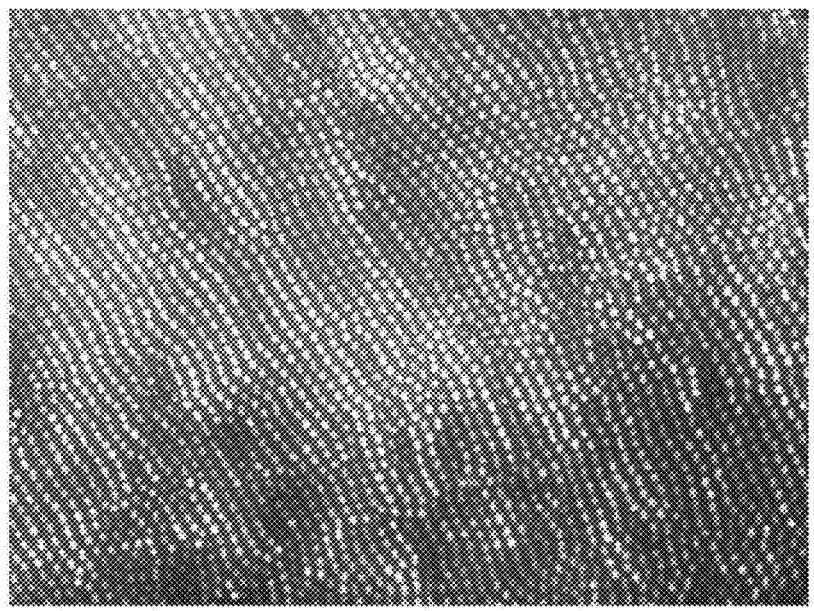
FIG. 3A is an optical transmission image of a CsI—$NaNO_3$-based phase-separated crystalline scintillator body according to an embodiment.
Figure 3B:
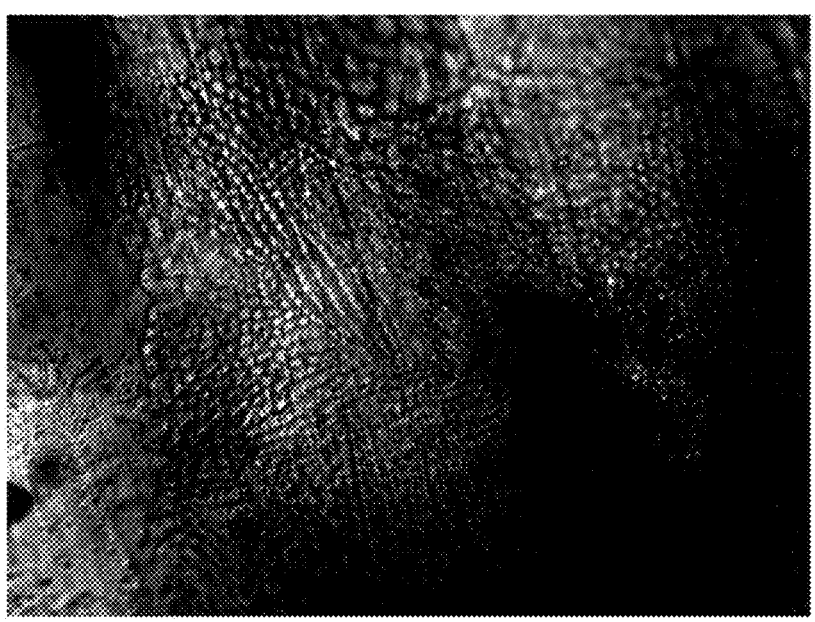
FIG. 3B is an optical transmission image of a RbI—$NaNO_3$-based phase-separated crystalline scintillator body according to an embodiment.

First, CsI and RbI were each mixed with 80% by mole of $NaNO_3$ and separately enclosed in quartz tubes to yield samples. Then, the samples were introduced into a Bridgman furnace as schematically shown in FIG. 2A, and heated up to 330° C. After being melted, the samples were held at that temperature for 30 minutes and then pulled down to be gradually solidified from the lower side. After being taken from the furnace, the resulting two samples were observed in a transmissive position through an optical microscope for the structure thereof. As a result, the CsI—$NaNO_3$ sample had a favorable structure, and whose plane in a direction perpendicular to the solidification direction had the structure shown in FIG. 3A. Similarly, the RbI—$NaNO_3$ sample also had a favorable structure, and whose plane in a direction perpendicular to the solidification direction had the structure shown in FIG. 3B. In addition, the present inventors observed the samples through a scanning electron microscope (SEM) and confirmed that columnar crystals extended in a direction parallel to the solidification direction. Furthermore, the samples were subjected to composition analysis that is an accessory function of the SEM and found that the columnar crystals were made of CsI or RbI and surrounded by $NaNO_3$. Thus, it was found that there can be provided a structure including a plurality of columnar crystals extending in a direction and surrounded by $NaNO_3$. The regions of CsI and RbI having high refractive indices were bright in the images shown in FIGS. 3A and 3B taken using transmitted light. This shows that light was guided as expected.

CsI-based and RbI-based samples doped with Tl, In or Ga as a luminescence center were also examined. These samples exhibited emission wavelengths substantially the same as the monocrystalline CsI or RbI sample, keeping high luminance.

Example 1 shows that a phase-separation scintillator including CsI or RbI first crystalline phases or columnar crystals of the above-described embodiment can be provided.

EXAMPLE 2

In Example 2, a radiation detector including the above-described phase-separated scintillator body was produced.

A CsI—NaNO$_3$-based material selected from the applicable materials was cut into a phase-separated crystalline scintillator body of 0.5 mm in thickness, and a radiation detector was prepared by disposing the scintillator body on a photodetector array in such a manner that CsI columnar crystals were arranged generally in a vertical position. For comparison, a radiation detector including a CsI—NaCl scintillator body was also prepared which includes NaCl columnar crystals. When the phase-separated crystalline scintillator bodies of these radiation detectors were irradiated with an X-ray spot radiation of 50 μm in diameter, the light from the CsI—NaNO$_3$-based scintillator was not diffused as much as the light from the CsI—NaCl-based scintillator, and had a half-width about 30% smaller than the light from the comparative scintillator in the luminescent distribution. Thus, columnar crystals made of a high-luminance scintillator material exhibited further improved wave-guiding performance.

Also it was confirmed that even if the CsI—NaNO$_3$ phase-separated crystalline scintillator body and a photodetector array were joined together with a resin, light diffusion was suppressed. Thus, a structure including the phase-separated crystalline scintillator body and a photodetector array with another material layer therebetween can function as a radiation detector as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-170447, file Aug. 20, 2013 which is hereby incorporated by reference herein in its entirety.

What is claimed is:

1. A crystalline scintillator body comprising:
a plurality of first crystalline phases, each being a columnar crystal made of a material containing at least one of cesium iodide and rubidium iodide; and
a second crystalline phase in which the plurality of first crystalline phases are present, the second crystalline phase being made of a material containing sodium nitrate.

2. The crystalline scintillator body according to claim 1, wherein the crystalline scintillator body has a first face and a second face that are not coplanar with each other, and wherein the first crystalline phases are continuous from the first face to the second face, and the second crystalline phase is continuous from the first face to the second face.

3. The crystalline scintillator body according to claim 1, wherein the first crystalline phases contain $Cs_xRb_{1-x}I$, wherein 0≤X≤1 holds true.

4. The crystalline scintillator body according to claim 3, wherein the first crystalline phases contain $Cs_xRb_{1-x}I$, wherein 0.00≤X<0.15 or 0.85<X≤1.00 holds true.

5. The crystalline scintillator body according to claim 3, wherein the first crystalline phases further contain an element other than the elements constituting $Cs_xRb_{1-x}I$ as a luminescence center.

6. The crystalline scintillator body according to claim 3, wherein at least one of the Cs and the Rb of the $Cs_xRb_{1-x}I$ is partially substituted with at least one element selected from the group consisting of K, Na and Li.

7. The crystalline scintillator body according to claim 1, wherein the second crystalline phase consists of NaNO$_3$.

8. The crystalline scintillator body according to claim 7, wherein the second crystalline phase further contains a nitrogen oxide salt other than NaNO$_3$.

9. The crystalline scintillator body according to claim 8, wherein the nitrogen oxide salt is NaNO$_2$.

10. A radiation detector comprising:
the crystalline scintillator body as set forth in claim 1; and
a photodetector that detects light from the crystalline scintillator body.

11. A crystalline scintillator body comprising:
a plurality of first crystalline phases, each being a columnar crystal made of a material containing at least one of cesium iodide and rubidium iodide; and
a second crystalline phase in which the plurality of first crystalline phases are present, the second crystalline phase being made of a material containing sodium nitrate,
wherein a material of the first crystalline phases and a material of the second crystalline phase form a eutectic structure.

12. The crystalline scintillator body according to claim 11, wherein a composition ratio in the crystalline scintillator body of the material of the first crystalline phases to the material of the second crystalline phase is within ±5% by mole of the eutectic composition ratio of the materials of the first crystalline phases to the second crystalline phase.

13. The crystalline scintillator body according to claim 11, wherein the first crystalline phases contain $Cs_xRb_{1-x}I$, wherein 0≤X≤1 holds true.

14. The crystalline scintillator body according to claim 11, wherein the second crystalline phase consists of NaNO$_3$.

15. A radiation detector comprising:
the crystalline scintillator body as set forth in claim 11; and
a photodetector that detects light from the crystalline scintillator body.

* * * * *